United States Patent [19]
Mohammed

[11] Patent Number: 5,443,300
[45] Date of Patent: Aug. 22, 1995

[54] POWERED GLARE SCREEN DEVICE

[76] Inventor: Gaffar Mohammed, 3080 Peace Court, Windsor, Ontario N8T 2J4, Canada

[21] Appl. No.: 206,391

[22] Filed: Mar. 4, 1994

[51] Int. Cl.⁶ .................................................. B60J 3/02
[52] U.S. Cl. ................... 296/97.4; 296/97.8; 160/37; 160/188
[58] Field of Search .................. 296/97.4, 97.8, 99.1, 296/2.4, 70; 160/37, 188, 310

[56] References Cited

U.S. PATENT DOCUMENTS 5,083,598  1/1992  Schön ..................... 160/84.02

FOREIGN PATENT DOCUMENTS 41620  2/1986  Japan ..................... 296/97.4
67621  4/1986  Japan ..................... 296/140
6108763  4/1994  Japan ..................... 160/238

Primary Examiner—Dennis H. Pedder
Attorney, Agent, or Firm—John R. Benefiel

[57] ABSTRACT

A glare screen device for automobiles including a housing attachable above the windshield frame, with a tinted plastic glare screen panel power drivable is in and out of the housing to be selectively extended in front of the windshield. The drive includes sprocket mechanisms engaging sprocket openings along either side of the glare screen panel. The housing is either generally flat with downwardly curved end out of which the glare screen panel projects, or generally rounded having a downwardly curved projecting portion out of which the glare screen panel is extended. The sprocket mechanisms each include an endless belt having sprocket pins distributed along the outside, a reversible electric motor driving gearing to recirculate the endless belts.

14 Claims, 2 Drawing Sheets

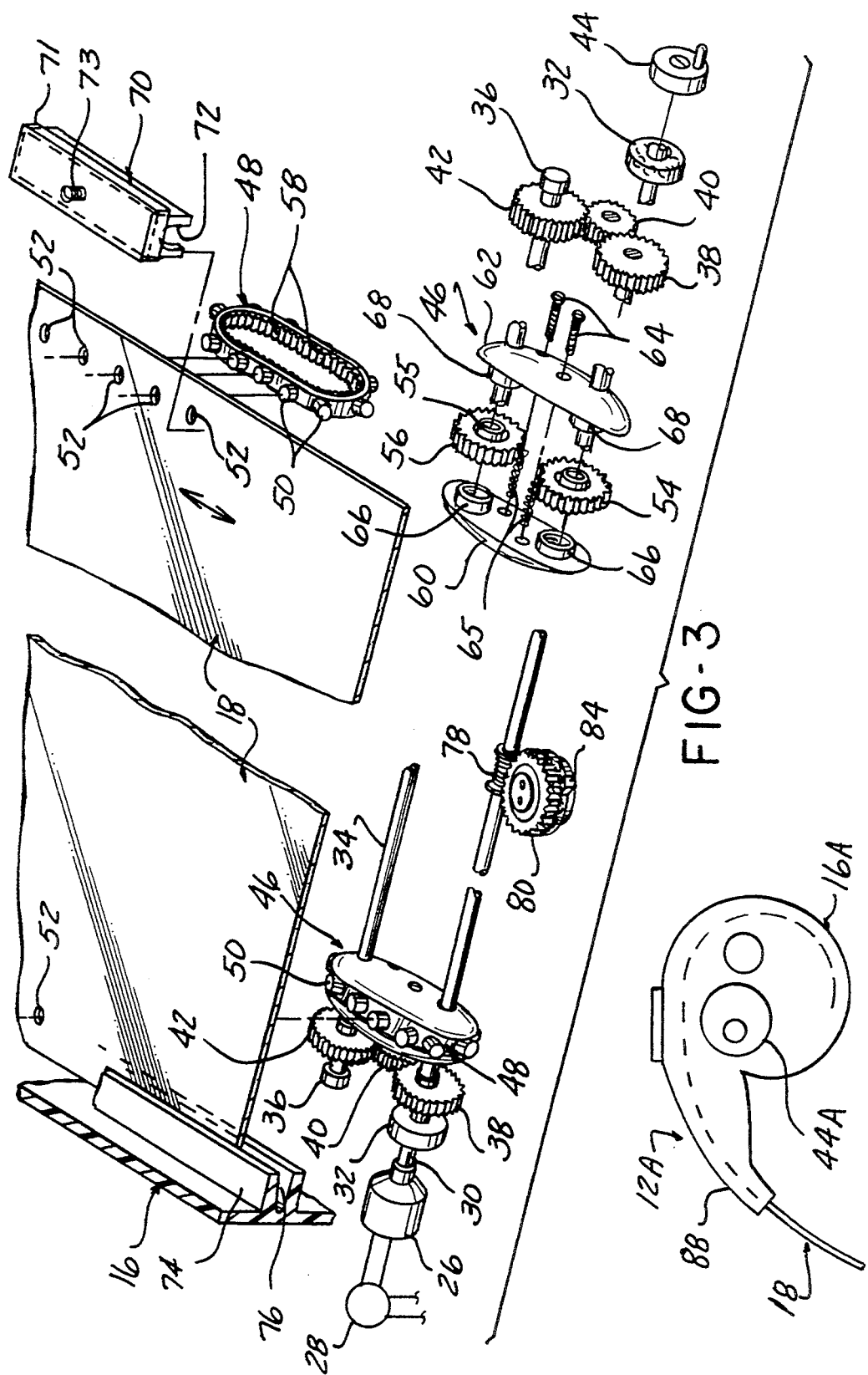

POWERED GLARE SCREEN DEVICE

BACKGROUND OF THE INVENTION

1. Field of the Invention

This invention concerns self powered, portable glare screens for automotive vehicles such as cars and trucks, and more particularly glare screens for the windshield or rear glass which are selectively extendible and retractable over the inside of the windshield.

2. Description of the Prior Art

The problem of eliminating glare for the driver (and passengers) of automotive vehicles has not heretofore been solved completely satisfactorily.

The most common solution has included fold down visors which are standard equipment on cars and trucks. When these are used, a substantial obstruction of the viewing area results. Tinting of the windshield is also widely practiced, but this is usually limited to the upper edges of the windshield lest the view be unduly darkened under nighttime or low light conditions.

The sun is often at low angles during commuting times of day, and the rays of the sun are often able to penetrate the glass below the tinting and create intense glare.

Numerous retractable glare screen devices have thus been proposed, some of which are powered, for example, see U.S. Pat. No. 5,076,633 issued on Dec. 31, 1991; U.S. Pat. No. 5,000,506 issued on Mar. 19, 1991; and U.S. Pat. No. 3,363,666 issued on Jan. 16, 1968.

These devices have not been completely satisfactory as being too complicated or bulky, inconvenient to use, or costly to manufacture and install, particularly when added as an accessory.

These above referred to devices firstly lack simplicity of design, and most importantly are complicated to install and thus are costly. The automobile must be substantially modified by the manufacturers to accommodate these complex devices, which in turn will increase the cost to the consumer. Secondly, these devices for the most part can only be factory installed in new automobiles, and when once installed, can only be used for that particular vehicle. Thus, when buying another car, the consumer has to again pay for a new glare screen and the cost keeps adding on. The prior devices are intended for new vehicles only, and are not feasible to install in existing cars.

The object of the present invention is to provide a portable powered glare screen device which is simple, effective and convenient to use and install and which may be manufactured at low cost.

SUMMARY OF THE INVENTION

The present invention is a glare screen device comprised of a hollow housing adapted to be installed on the inside of the auto roof above the windshield header. The housing holds a glare screen which projects a few inches when retracted, but which may be panel power driven so as to be extended out of the housing in use, descending to a point where it covers a major portion of the vehicle windshield.

The glare screen panel itself is sufficiently stiff to be self supporting and is darkly tinted on the top portion and gradually lightens up towards the screen leading edge to be effective in bright sunlight.

The power drive of the glare screen panel includes sprocket mechanisms each including an endless sprocket belts on each side of the glare screen panel, having a series of protrusions spaced to engage sprocket openings in the glare screen panel sides along the rear retracted portion of the screen. The sprocket belts are driven by pairs of gears driving internal teeth on the belts, the gears driven by primary and secondary shafts extending across the housing, the shafts in turn driven by a selectively energizable and reversible drive motor, or manually by a crank handle, and/or by means of tabs provided on the leading edge of the glare screen panel to pull it up and down.

A positive stop arrangement limits advancing and retracting of the glare screen panel.

The housing may be generally flat but with a downwardly curved end out of which the glare screen panel extends or may also be generally round with the downwardly curved projecting portion to be more compact to be adapted to convertible top automobiles and rear windows of sedans.

This present invention is contemplated as a self contained add-on accessory which can be installed in new cars as they are assembled as well as in previously manufactured automobiles by the simple means of wiring the motor either in the main electrical circuit or by simply plugging it in the cigarette lighter by means of an adapter. A third option is to operate this device by means of small "C" or "D" rechargeable batteries which is even simpler to implement. This device is made very light and can be easily detachable to be reinstalled in other cars as need be. The consumer therefore has to buy this only once and can use the same for years to come, in any number of automobiles.

This device may also be used for the rear window to block the glare of the headlights from behind.

DESCRIPTION OF THE DRAWINGS

FIG. 3 is an exploded perspective view of the internal components of the device shown in FIG. 2.

FIG. 4 is an end view of an alternate configuration of the glare screen device according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
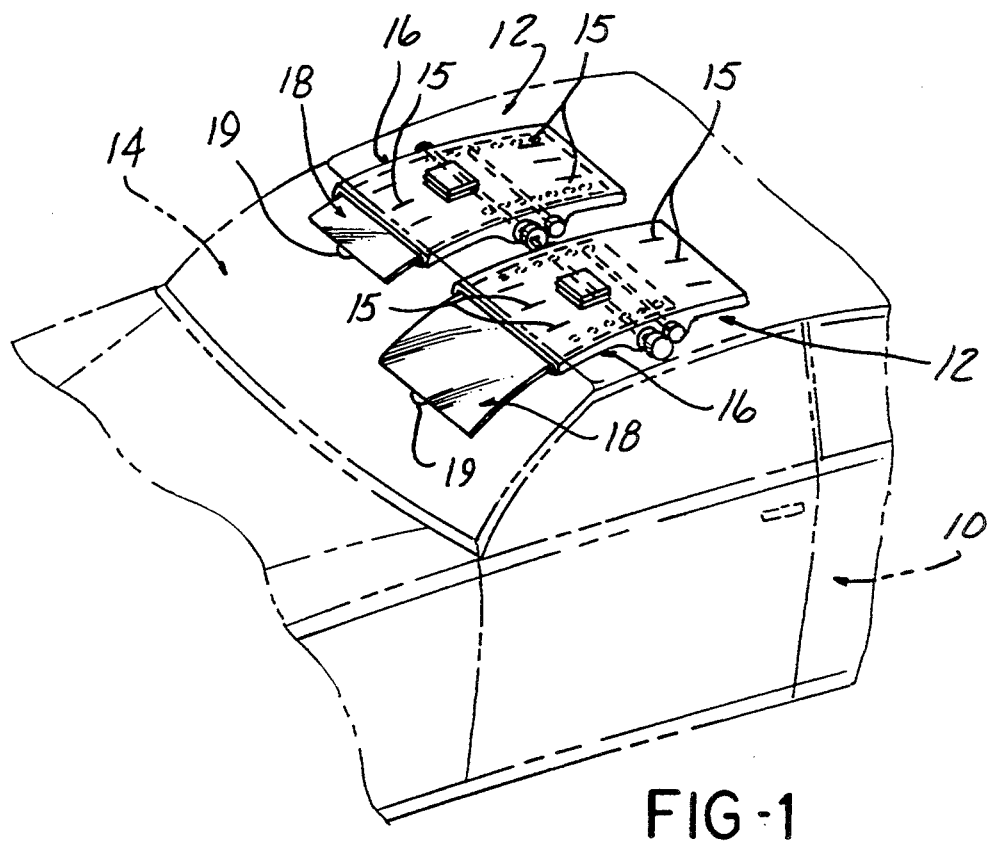
FIG. 1 is a perspective fragmentary view of an automobile shown in phantom with glare screen devices according to the present invention installed on the driver and passenger side respectively.

Referring to the drawings and particularly FIG. 1, an automobile 10 is shown, having a pair of glare screen devices 12 installed on the driver's side and passenger side respectively. These devices 12 are installed on the inside of the vehicle roof, just to the rear of the vehicle windshield 14 and above the windshield header.

Each device 12 includes a housing 16 which contains a glare screen panel 18 which may be selectively driven to an extended position (shown on the driver's side) to cover a substantial portion of the windshield directly in front of the driver. In the retracted position, (shown on the passenger side) the screen panel 8 projects out of its housing 16 by about 4" to 5", so that the top portion of the windshield is covered to serve the function of a tinted portion of the windshield which tinting can therefor be dispensed with.

The present device will also allow elimination of visors, so that together with the elimination of the tinted windshield, considerable cost saving results.

The glare screen panel 18 is constructed of a self supporting sheet of transparent but darkly tinted plastic, darkest at the top and which gradually lightens up towards the lower edge. The plastic should be resistant to solar radiation, acrylic plastic being one suitable material.

The housing 16 may be constructed of two parts of molded plastic held together as with snap brackets (not shown). The exterior of the housing parts preferably have a rubberized coating to minimize the bumping hazards presented by its presence.

The housing 16 is removably attachable to the inside ceiling by means of a pair of magnets, 20, 22, magnet 20 affixed to the headliner 24, magnet 22 affixed to the upper surface of the housing 16. It can also be attachable by means of a pivot bracket or directly to the existing visor bracket by means of clips (not shown).

A drive mechanism, best seen in FIG. 3, is provided for powered movement of the glare screen panel 18 between an extended and a retracted position as described.

The drive mechanism includes a reversible electric motor 26, selectively controlled by a reversing on-off switch 28 interposed in the power leads and located for convenient operation.

The drive motor 26 is directly connected to a primary drive shaft 30 supported on bearings 32 at either end in the housing 16.

A parallel secondary shaft 34 mounted by bearings 36 at either end is driven by the primary shaft 30 by a gear train including large diameter pinion gears 38 affixed to the primary drive shaft, intermediate idler gears 40 rotatably mounted in the housing 16 and large diameter pinion gears 42 affixed to the secondary shaft 34. The secondary shaft 34 thus rotates in the same direction as the primary shaft 30.

A hand crank handle 44 affixed to the primary shaft 30 allows manual operation. A tab 19 affixed to the protruding edge also allows manual pull out of the screen panel 18, alternatively.

The primary and secondary shafts 30, 34 pass through right and left sprocket mechanisms 46, each located on a respective side of the glare screen panel 18.

Each sprocket mechanism 46 includes an internally toothed endless belt 48, each belt 48 having a series of equispaced outwardly projecting sprocket pins 50 which are arranged around the perimeter thereof. The sprocket pins 50 are adapted to successively engage a series of sprocket openings 52 formed along either side of the rear position of the glare screen panel 18. Each endless belt has a segment following a linear path when engaging the glare screen panel openings 52.

The sprocket belts 48 are each received over a pair of spaced pinion gears 54, 56 attached to the primary shaft 30 and secondary shaft 34 respectively as with collars 55. The internal teeth 58 of the sprocket belts 48 engage the teeth of the pinion gears 54, 56 to be driven thereby. The sprocket belts 48 are retained and guided in an endless path by sprocket housing members 60, 62 (fixed in housing 16), members 60, 62 secured together with adjustment screws 64, bosses 66, 68, each received over a collar 55. The bosses 66, 68 are each received in recesses in the gears 54, 56 with a light pressure engagement therewith so as to allow rotation of the pinion gears 54, 56 with the shafts 30, 34. Springs 65 may be employed to keep the housing members 60, 62 spaced apart to insure free movement of the belt 48. The inner surfaces of each sprocket housing member 60, 62 acts to guide the respective side edges of the sprocket belts 48.

Telescoping guide members 70, 71 are mounted in the housing 16, lower member 70 having an opening 72 located so as to straddle a respective sprocket belt 48 and bear against the upper surface of the glare screen panel 18 on either side, upper member 71 fixed to the housing 16. The adjustable pressure created by advancement of a screw 13 in the upper member 71 and engaging the lower member 70 holds the glare screen panel 18 down on either side in engagement with the pins 50.

Side guides 74 on each side of the housing 16 each have a slot 76 receiving a respective side of the glare screen panel 18.

Figure 2:
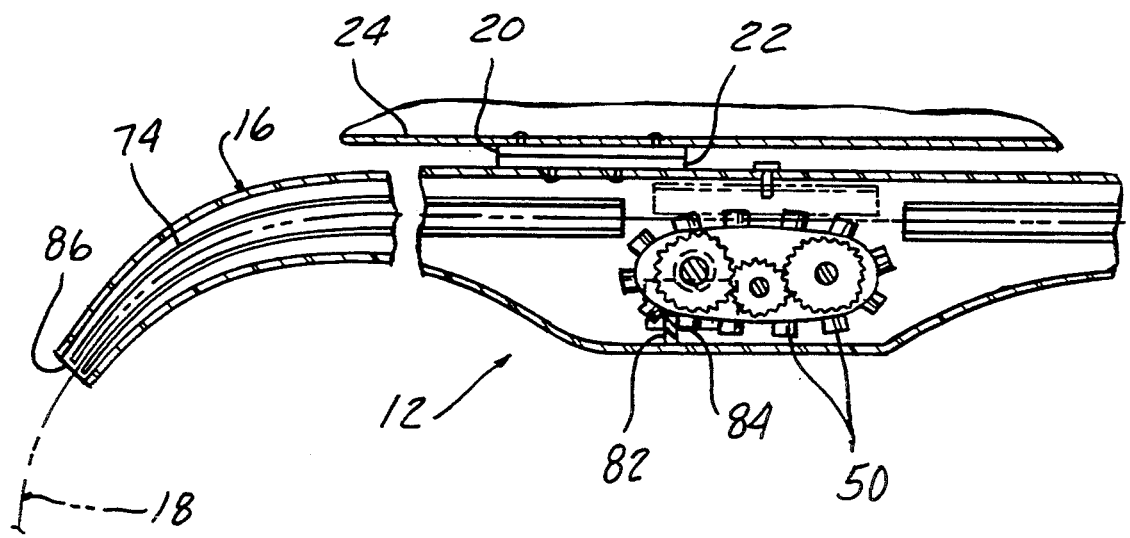
FIG. 2 is a longitudinal sectional view taken through a glare screen device according to the invention.

A worm gear 78 fixed on the primary shaft 30 drives a pinion gear 80, which is mounted by an antifriction bearing on a post (not shown). Fixed stops 82 (FIG. 2) engage a stop pin 84 at respective rotated positions corresponding to the fully extended and retracted positions of the glare screen panel 18.

The generally flat housing 16 has a downwardly curved projecting portion at the forward end thereof to conform to the roof line and also to guide the glare screen panel 18 in a downward direction after exiting a slot 86 (FIG. 2) at the forward end.

Vents 15 are provided in the housing 16 to prevent overheated air from building up in the interior.

FIG. 4 shows an alternate shape of the housing 16A in another embodiment of a glare screen device 12A. This shape is round with a spoutlike downwardly curving end 88. The glare screen panel 18 is wound up upon retraction into the housing 16A.

This shape is adapted to convertible top automobiles and can also be used at the rear window of a sedan.

It can thus be appreciated that the present invention provides a self powered, portable and effective glare screen device that is substantially self-contained to be convenient to install and use, allowing a full view while eliminating excessive glare.

The compact but reliable drive mechanism can be manufactured at low cost, and can be removed for use in another vehicle.

I claim:

1. A portable, self-contained glare screen device for automotive vehicles such as cars and trucks comprising:
   a hollow housing;
   attachment means for attaching said housing within the passenger compartment of an automotive vehicle above a glass window to be screened against glare;
   a tinted glare screen panel sufficiently stiff to be self supporting and mounted for movement in and out of a slot in said housing, from an extended position to a retracted position;
   a drive mechanism including a selectively energizable reversible electric drive motor, a sprocket mechanism in said housing on each side of said glare screen, each sprocket mechanism including a series of recirculating sprocket pins linearly engaging sprocket openings along a respective side of said glare screen panel, said drive motor connected to a primary drive shaft driving each sprocket mechanism to cause recirculation of said sprocket pins and driving of said glare screen panel in and out of said housing.

2. A glare screen device according to claim 1 wherein said housing is generally flat but with a side thereof formed with said slot curved downwardly when installed on said inside of said roof of said automotive vehicle.

3. A glare screen device according to claim 1 further including stop means for limiting drive of said glare screen panel out of said housing.

4. A glare screen device according to claim 1 further including a slotted track guide in said housing on either side of the inside of said housing receiving a respective side edge of said glare screen panel.

5. A glare screen device according to claim 1 wherein each sprocket mechanism comprises an endless belt mounted for recirculation in the direction of in and out movement of said glare screen panel, said belt carrying said pins along the length thereof, said primary shaft drivingly connected to each endless belt to cause said recirculation thereof upon energization of said drive motor in either direction.

6. A glare screen device according to claim 4 wherein said endless belt of each sprocket mechanism is guided to recirculate along a linear path while engaging said glare screen panel.

7. A glare screen device according to claim 5 wherein said endless belt of each sprocket mechanism is internally toothed, and wherein a pair of spaced pinion gears driven by said primary shaft engages the inside of each endless belt, said spacing of said pinion gears establishing said linear path.

8. A glare screen device according to claim 7 wherein said primary shaft extends through and drives one of said pinion gears of both sprocket mechanisms and further including a secondary shaft parallel to said primary shaft extending through and supporting the other pinion gears in each sprocket mechanism, said secondary shaft drivingly connected to said primary shaft to be rotated in the same direction.

9. A glare screen device according to claim 1 further including a manual drive handle drivingly connected to said primary shaft for allowing alternate manual drive of said glare screen panel.

10. A glare screen device according to claim 1 wherein said housing has a generally rounded cross sectional shape with a projecting downwardly curved portion formed with said slot.

11. A glare screen device according to claim 1 wherein said attachment means for attaching said housing comprises a pair of magnets, one fixed to the upper side of said housing, the other attached to the inside of said roof.

12. A glare screen according to claim 1 wherein said glare screen panel remains projecting out of said housing by several inches when retracted.

13. A glare screen according to claim 1 wherein said glare screen panel is tinted with increasing darkness from said projecting edge.

14. A glare screen according to claim 1 wherein said glare screen panel is formed with a tab on the outer projecting edge for manual pull out.

* * * * *